United States Patent Office 3,056,689
Patented Oct. 2, 1962

3,056,689
TITANIUM AND ALUMINIUM SALT SOLUTIONS
Derek John Oliver, Grimsby, and Stanley Frederick Craddock, Scarthoe, Grimsby, England, assignors to Laporte Titanium Limited, London, England, a British company
No Drawing. Filed May 25, 1960, Ser. No. 31,540
Claims priority, application Great Britain May 29, 1959
26 Claims. (Cl. 106—300)

This invention relates to the manufacture of mixed aqueous solutions of titanium and aluminium sulphates.

Such solutions have a number of uses. Thus, for example, they may be used for depositing hydrated aluminium oxide and hydrated titanium dioxide on titanium dioxide pigments in order to improve chalk resistance, anti-yellowing and other properties of the pigments. These improved pigments may be used in the manufacture of paints.

The titanium sulphate component of the mixed solution may most conveniently be prepared by reacting sulphuric acid with a suitable form of titanium dioxide and, as these solutions must have a high degree of purity for most applications, it is necessary to use titanium dioxide having a high degree of purity. The most economical and widely used method of obtaining titanium dioxide of a high degree of purity from a titanium-containing ore such as, for example, ilmenite, is what is commonly referred to as the sulphate process. In this process, the ore, or a concentrate formed therefrom, is sulphated using concentrated sulphuric acid and the resulting titanium sulphate is hydrolysed to give an aqueous suspension of a titanium dioxide hydrolysate. This suspension contains considerable quantities of impurities, principally iron, which are then removed by filtering and washing the suspended material. In order to obtain satisfactory filtration, it is customary to use a filter aid, which is a particulate substance that is placed on the filter cloths before filtration and serves to prevent fine particles of the titanium dioxide hydrolysate from entering and blocking the pores of the filter cloths. When the filter residue is removed from the filter cloths, substantially all the filter aid becomes incorporated with the titanium dioxide as an impurity. If the titanium dioxide is to be employed as a pigment, the washed hydrolysate is calcined and if, as is usual, the filter aid used is an organic substance, for example, wood flour, it is burned away during the calcination. Any traces of inorganic matter that may be present in the filter aid are too small to have any significant effect on the properties of the pigment.

When an attempt is made to form a solution of titanium sulphate by reacting sulphuric acid with titanium dioxide prepared in this way, a problem arises. The calcined titanium dioxide does not react satisfactorily with sulphuric acid and it is therefore necessary to use the hydrolysate before calcination, but this contains the organic filter aid, which is charred by the concentrated sulphuric acid and so discolours and seriously contaminates the titanium sulphate solution, the charred matter being difficult to remove from the solution. Also, the reaction between the filter aid and the sulphuric acid causes an excessive amount of foaming which results in poor mixing of the titanium dioxide with the sulphuric acid and makes the whole operation difficult.

This invention provides a process for the manufacture of an aqueous solution of aluminium and titanium sulphates, which comprises filtering an aqueous suspension of a titanium dioxide hydrolysate using an organic filter aid, incorporating hydrogen peroxide with the filtered titanium dioxide, thereafter dissolving the titanium dioxide in sulphuric acid and forming a solution containing aluminium sulphate in admixture with the titanium sulphate, the quantity of hydrogen peroxide being so related to the quantity of the organic filter aid present as an impurity in the titanium dioxide after filtration that the sulphate solution is substantially free from carbonaceous colouring matter.

The hydrogen peroxide oxidises the organic filter aid substantially completely and does not impair the suitability of the titanium dioxide for reaction with the sulphuric acid. It is important that the hydrogen peroxide should be incorporated with the titanium dioxide before any substantial quantity of sulphuric acid is incorporated with the titanium dioxide, because it has been found that the hydrogen peroxide does not react satisfactorily with the filter aid after charring has set in.

The filter aid is preferably wood flour and the quantity of hydrogen peroxide used is then advantageously equal, on a weight basis, to at least one third of the quantity of wood flour used.

The concentration of the sulphuric acid should be within the range of from 93% sulphuric acid to 20% oleum, the concentration being so selected from this range having regard to the quantity of water previously incorporated with the titanium dioxide, that the temperature, whether external heat (which is not usually necessary) is supplied or not, reaches at least 120° C.

The aluminium sulphate may be formed by reacting sulphuric acid with any form of aluminium suitable for undergoing reaction with sulphuric acid, advantageously aluminium metal or, preferably, aluminium hydroxide or hydrated alumina.

Advantageously, the titanium dioxide hydrolysate is washed after it has been filtered.

The aluminium sulphate component of the mixed solution may be formed separately from the titanium-containing component and incorporated with the titanium-containing component at any time after both the filtration and (if it is carried out) the washing of the titanium dioxide hydrolysate.

Advantageously, the aluminium sulphate component of the mixed solution is formed in the presence of the titanium-containing component. Thus aluminium in a form capable of undergoing reaction with sulphuric acid may be incorporated with the titanium-containing component after the filtration. Alternatively, in the case of aluminium that is in a form that is substantially insoluble in the aqueous suspension of the titanium dioxide hydrolysate, the aluminium is advantageously incorporated with the titanium dioxide after the filtration and before the incorporation of the sulphuric acid with the titanium dioxide hydrolysate, and preferably before the incorporation of the hydrogen peroxide with the hydrolysate. If the aluminium is incorporated with the hydrolysate before the sulphuric acid is incorporated, the heat of solution of the aluminium supplies a large part of the heat required for the reaction between the sulphuric acid and the titanium dioxide. Instead, aluminium hydrate may be dissolved in an excess of sulphuric acid and titanium dioxide hydrolysate thereafter added to the resulting solution.

The invention also provides a modification of the process specified above, wherein, instead of hydrogen peroxide, an inorganic peroxy substance (as hereinafter defined) is incorporated with the filtered titanium dioxide, the quantity of the inorganic peroxy substance being so related to the quantity of the organic filter aid present as an impurity in the titanium dioxide after the filtration that the sulphate solution is substantially free from carbonaceous colouring matter.

The term "inorganic peroxy substance" is used throughout the specification to mean an inorganic peracid, or a sodium, potassium or ammonium salt of an inorganic peracid, or a mixture of more than one of these compounds.

When the filter aid is wool flour, the quantity of the inorganic peroxy substance used (calculated as hydrogen peroxide) is advantageously equal, on a weight basis, to at least one-third of the quantity of the wood flour used.

The total quantity of sulphuric acid needed to produce a given quantity of the mixed solution containing given concentrations of titanium and aluminium sulphates can readily be found by simple experiment and will depend to some extent on the stage at which the aluminium is incorporated with the titanium-containing component. A rough guide, however, is to allow 2 mols. of sulphuric acid for each mol. of the hydrolysate calculated as titanium dioxide and 3 mols. of sulphuric acid for each mol. of aluminium calculated as $Al_2O_3$.

The proportions of aluminium and titanium sulphates in the final solution are advantageously within the range of from 0.5 to 2.5 mols. of aluminium sulphate (calculated as $Al_2O_3$) per mol. of titanium sulphate (calculated as $TiO_2$).

The mixed solution is hot and viscous, and may be cast into metal or plastic moulds to give a mixture of sulphates of aluminium and titanium. Alternatively, the solution may be diluted to prevent crystallisation on cooling.

The solution, after being subjected to a simple filtering operation, is suitable for the surface treatment of pigments and fillers, and the invention also provides a method of treating a pigment or filler which comprises depositing hydrated titanium dioxide and alumina on the pigment or filler from a mixed aqueous solution of titanium and aluminium sulphates manufactured by the process specified above or the modification thereof. The pigment may be a titanium dioxide pigment, a composite pigment containing titanium dioxide or a coloured pigment. The filler may be, for example, blanc fixe or calcium sulphate. The invention further provides such a pigment or filler having been so treated and also a paint composition containing a pigment that has been so treated.

The following examples illustrate the invention, the parts being by weight:

Example 1

An aqueous solution of titanium sulphate was hydrolysed in a known manner to give an aqueous suspension of a titanium dioxide hydrolysate. The hydrolysate was filtered and washed in a conventional manner using Moore filters and wood flour as a filter aid. The washed pulp contained approximately 2% of wood flour based on the $TiO_2$ and approximately 35% $TiO_2$ by weight.

To 2,148 pounds of the diluted washed pulp, which contained 697.5 pounds of $TiO_2$, there were added 2.2 gallons of an aqueous solution of hydrogen peroxide of 30% strength and then 1,090 pounds of alumina hydrate (containing 64% $Al_2O_3$ by weight). The whole was thoroughly mixed using a high speed agitator, the temperature of the mixture being 20° C., and then 250 gallons of an aqueous solution of sulphuric acid of 98% strength were added over a period of 20 minutes. The temperature of the mixture rose to 130° C. without external heat being supplied and the temperature was maintained at this value by passing steam through a coil immersed in the mixture. Substantially complete dissolution was obtained in 15 minutes and the hot viscous solution was light brown in colour showing that only a trace of carbon particles was present.

A portion of the hot viscous solution was run into plastic moulds to give cast blocks of a water soluble titanium aluminium sulphate complex. The remainder of the solution was diluted with washings from vessels in which a previous batch had been made. Both this diluted solution and an aqueous solution of the complex were suitable for the surface treatment of pigments after the solutions had been subjected to a simple filtration operation.

Example 2

A yellow titanium pigment was prepared by forming a thick aqueous suspension containing 100 parts of titanium dioxide, 16.5 parts of hydrated nickel sulphate, and 18 parts of antimony oxide. The titanium dioxide used was a washed titanium dioxide hydrolysate prepared in the manner described in Example 1.

The suspension was thoroughly stirred and then dried, and the resulting dry material was calcined at a temperature of 950° C. The calcined material was ground to give a yellow titanium pigment.

1,000 pounds of this yellow titanium pigment were dispersed in water by incorporating approximately 325 gallons of water with the pigment and then milling the resulting slurry with 10 gallons of sodium silicate solution containing 0.50 pound of sodium silicate (calculated as $SiO_2$) per gallon. The resulting suspension contained 3.0 pounds of the yellow titanium pigment per gallon of the suspension. The coarse particles in the suspension, that is to say, particles of which the diameter was larger than about 5 microns, were removed by hydroclassification, and there remained 325 gallons of a suspension which contained a total of 950 pounds of the yelow titanium pigment. This suspension was treated with 13.6 gallons of a solution of titanium and aluminium sulphates, which was prepared as described in Example 1 and which contained 0.70 pound of titanium sulphate (calculated as $TiO_2$) and 0.70 pound of aluminium sulphate (calculated as $Al_2O_3$) per gallon of the solution.

The treated suspension was then neutralised to pH 7 by incorporating an aqueous solution containing 1.00 pound of sodium hydroxide per gallon, which caused the precipitation of hydrous oxides of silicon, aluminium and titanium. The resulting suspension was filtered, washed to remove soluble salts, and then dried. The dried material was disintegrated in a fluid energy mill of the microniser type to give a yellow titanium pigment which, as compared with the untreated pigment, had improved fineness, a reduced tendency to cake when stored, improved dispersion characteristics, improved gloss retention, improved colour, and improved hiding power.

Example 3

An aqueous solution of titanium sulphate was hydrolysed in a known manner to give an aqueous suspension of a titanium dioxide hydrolysate. The hydrolysate was filtered and washed in a conventional manner using Moore filters and wood flour as a filter aid. The washed pulp contained approximately 2% of wood flour based on the $TiO_2$.

The washed pulp contained 2.96 pounds of $TiO_2$ per gallon and to 1,166 gallons of the washed pulp there were added first 100 gallons of an aqueous solution of Caro's acid (permonosulphuric acid) of 11% strength and then 5,450 pounds of alumina hydrate, which contained approximately 64% $Al_2O_3$ by weight. The whole was thoroughly mixed and the temperature of the mixture was 25° C. 1,250 gallons of an aqueous solution of sulphuric acid of 96% strength were then added gradually over a period of 20 minutes. The temperature of the mixture rose to 128° C. without external heat being supplied and this temperature was then maintained by passing steam through a coil immersed in the mixture.

Substantially complete dissolution was obtained in 17 minutes and the hot viscous solution was light brown in colour showing that only a trace of carbon particles was present.

Example 4

Example 3 was repeated except that, in place of the 100 gallons of the aqueous solution of Caro's acid, there were added 350 pounds of a mixture of potassium sulphates containing approximately 50% by weight of potassium permonosulphate. The temperature of the mixture rose to 130° C. without external heat being supplied and a satisfactory solution, containing only a trace of carbon particles, was obtained in 16 minutes.

We claim:

1. A process for the manufacture of an aqueous solution of aluminium and titanium sulphates, which comprises filtering an aqueous suspension of a titanium dioxide hydrolysate using a cellulose containing filter aid, incorporating hydrogen peroxide with the filtered titanium dioxide, thereafter dissolving the titanium dioxide in sulphuric acid of a concentration within the range of 93% sulphuric acid to 20% fuming sulphuric acid and forming, at a temperature of at least 120° C., a solution containing aluminium sulphate having the concentration of 0.5 to 2.5 mols. of aluminium sulphate per mol. of titanium sulphate, the quantity of hydrogen peroxide being so related to the quantity of the cellulose containing filter aid present as an impurity in the titanium dioxide after filtration that the sulphate solution is substantially free from carbonaceous coloring matter.

2. A process as claimed in claim 1 wherein the filter aid is wood flour.

3. A process as claimed in claim 1 wherein the aluminium sulphate is formed by reacting sulphuric acid with aluminium metal.

4. A process as claimed in claim 1 wherein the aluminium sulphate is formed by reacting sulphuric acid with aluminium hydroxide.

5. A process as claimed in claim 1 wherein the aluminium sulphate is formed by reacting sulphuric acid with hydrated alumina.

6. A process as claimed in claim 1 wherein the titanium dioxide hydrolysate is washed after it has been filtered.

7. A process as claimed in claim 6 wherein the aluminium sulphate component of the mixed solution is formed separately from the titanium component and is incorporated with the titanium-containing component after the washing of the titanium dioxide hydrolysate.

8. A process as claimed in claim 1 wherein the aluminium sulphate component of the mixed solution is formed in the presence of the titanium-containing component.

9. A process as claimed in claim 8 wherein the aluminium sulphate component of the mixed solution is formed from aluminium in a form capable of undergoing reaction with sulphuric acid which is incorporated with the titanium-containing component after the filtration.

10. A process as claimed in claim 8 wherein to form the aluminium sulphate component of the mixed solution aluminium that is in a form that is substantially insoluble in the aqueous suspension of the titanium dioxide hydrolysate is incorporated with the titanium dioxide hydrolysate after the filtration and before the incorporation of the sulphuric acid with the titanium dioxide hydrolysate.

11. A process as claimed in claim 10 wherein to form the aluminium sulphate component of the mixed solution, aluminium that is in a form that is substantially insoluble in the aqueous suspension of the titanium dioxide hydrolysate is incorporated with the titanium dioxide hydrolysate after the filtration and before the incorporation of the hydrogen peroxide with the titanium dioxide hydrolysate.

12. A process as claimed in claim 8 wherein the aluminium sulphate component of the mixed solution is formed by dissolving aluminium hydrate in an excess of sulphuric acid and titanium dioxide is thereafter added to the resulting solution.

13. A process as claimed in claim 1 wherein the filter aid is wood flour and the quantity of hydrogen peroxide used is equal, on a weight basis, to at least one-third of the quantity of wood flour used.

14. A process for the manufacture of an aqueous solution of aluminium and titanium sulphate, which comprises filtering an aqueous suspension of a titanium dioxide hydrolysate using 2% wood flour as a filter aid, incorporating an aqueous solution of a 30% hydrogen peroxide with the filtered titanium dioxide, thereafter adding aluminium hydrate and then adding sulphuric acid 98% strength and forming a solution having a concentration of 0.5 to 2.2 mols. of aluminium sulphate per mol. of titanium sulphate, the temperature being maintained at 130° C. for 15 minutes.

15. A process for the manufacture of an aqueous solution of aluminium and titanium sulphates, which comprises filtering an aqueous suspension of a titanium dioxide hydrolysate using a cellulose containing filter aid, incorporating an inorganic peroxy substance selected from the group consisting of inorganic peracids, sodium, potassium and ammonium salts of inorganic peracids, and mixtures of more than one of these compounds, with the filtered titanium dioxide, thereafter dissolving the titanium dioxide in sulphuric acid of a concentration within the range of 93% sulphuric acid to 20% fuming sulphuric acid and forming, at a temperature of at least 120° C., a solution containing aluminium sulphate having the concentration of 0.5 to 2.5 mols. of aluminium sulphate per mol. of titanium sulphate, the quantity of inorganic peroxy substance being so related to the quantity of the cellulose containing filter aid present as an impurity in the titanium dioxide after filtration that the sulphate solution is substantially free from carbonaceous coloring matter.

16. A process as claimed in claim 15 wherein the filter aid is wood flour and the quantity of the inorganic peroxy substance used (calculated as hydrogen peroxide) is equal on a weight basis to at least one-third of the quantity of the wood flour used.

17. A process as claimed in claim 15 wherein the inorganic peroxy substance is Caro's acid.

18. A process as claimed in claim 15 wherein the inorganic peroxy substance is potassium permonosulphate.

19. A method of treating a pigment which comprises manufacturing an aqueous solution of aluminium and titanium sulphates by a process as claimed in claim 1 and depositing hydrated titanium dioxide from that solution on the pigment.

20. A method of treating a pigment as claimed in claim 19 wherein the pigment is a titanium dioxide pigment.

21. A method of treating a pigment as claimed in claim 19 wherein the pigment is a composite pigment containing titanium dioxide.

22. A method of treating a pigment as claimed in claim 19 wherein the pigment is a colored pigment.

23. A method of treating a yellow titanium pigment wherein said pigment is milled with sodium silicate solution, treated in acid suspension with a solution of titanium and aluminium sulphates prepared by the process claimed in claim 1, then the suspension is neutralized and the material dried and milled to give a coated yellow titanium pigment.

24. A method of treating a filler which comprises depositing hydrated titanium dioxide and alumina on the filler from an aqueous solution of aluminium and titanium sulphates prepared by a process as claimed in claim 1.

25. A method as claimed in claim 24 wherein the filler is blanc fixe.

26. A method as claimed in claim 24 wherein the filler is calcium sulphate.

References Cited in the file of this patent

UNITED STATES PATENTS

| | | |
|---|---|---|
| 2,149,370 | Smith | Mar. 7, 1939 |
| 2,257,278 | Schaumann | Sept. 30, 1941 |
| 2,366,047 | Nerlinger | Dec. 26, 1944 |
| 2,387,534 | Seidel | Oct. 23, 1945 |
| 2,671,031 | Whately | Mar. 2, 1954 |
| 2,998,321 | Evans | Aug. 29, 1961 |

OTHER REFERENCES

Hackh's Chemical Dictionary, 2d edition, 1937, page 653. Webster's New International Dictionary (unabridged), 2d edition, 1959, page 1697.